United States Patent

[11] 3,584,572

| [72] | Inventor | Anthony Apicella<br>39 Oaktree Lane, Levittown, N.Y. 11756 |
|---|---|---|
| [21] | Appl. No. | 706,318 |
| [22] | Filed | Feb. 19, 1968 |
| [45] | Patented | June 15, 1971 |

[54] METHOD, APPARATUS AND DIE ADAPTED TO SIMULTANEOUSLY HEAT STAMP, EMBOSS AND CUT
19 Claims, 16 Drawing Figs.

[52] U.S. Cl. .................................................... 101/27,
101/25, 101/27, 101/30, 101/31
[51] Int. Cl. ...................................................... B44b 5/00,
B44b 5/02
[50] Field of Search .......................................... 101/31, 32,
24, 25, 27, 30, 9, Dig. 4

[56] References Cited
UNITED STATES PATENTS

| 335,898 | 2/1886 | Compton | 101/30 |
|---|---|---|---|
| 463,991 | 11/1891 | Jackson et al. | 101/31 |
| 753,740 | 3/1904 | Rockstroh | 101/30 |
| 771,669 | 10/1904 | Schneegass | 101/30 UX |
| 1,825,342 | 9/1931 | Dreyfus et al. | 101/32 X |
| 1,850,856 | 3/1932 | Weindel, Jr. | 101/32 |
| 2,547,602 | 4/1951 | Schmitt | 101/44 |
| 2,688,775 | 9/1954 | Scherer et al. | 101/31 X |
| 3,289,573 | 12/1966 | Apicella | 101/27 |
| 3,366,042 | 1/1968 | Birch | 101/32 X |
| 2,043,432 | 6/1936 | Flood | 101/30 UX |
| 3,490,362 | 1/1970 | Massari | 101/28 |

*Primary Examiner*—Robert E. Pulfrey
*Assistant Examiner*—Clifford D. Crowder
*Attorney*—Auslander and Thomas

ABSTRACT: Apparatus to simultaneously heat stamp, emboss and cut a flexible workpiece, wherein the workpiece is impressed through a flexible substrate with a heated die with an intaglio design, the die heat transferring material on the substrate to the workpiece, embossing the workpiece in relief of the intaglio design and cutting the workpiece as defined by the peripheral ridge line on the die, the ridge line flexing the substrate without rupturing the same and penetrating the workpiece to cut the workpiece.

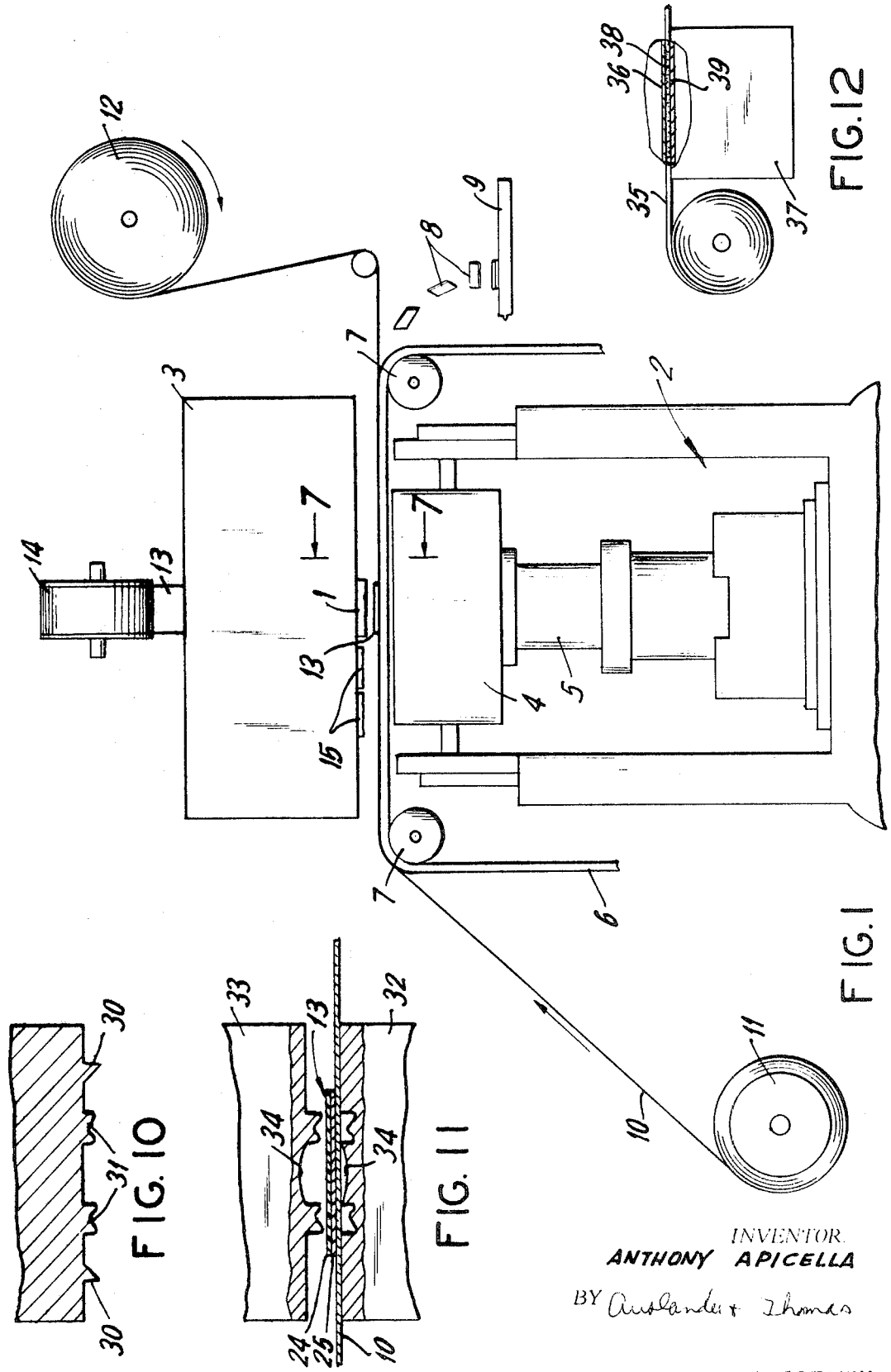

PATENTED JUN 15 1971

INVENTOR.
ANTHONY APICELLA

BY Auslander + Thomas

ATTORNEYS

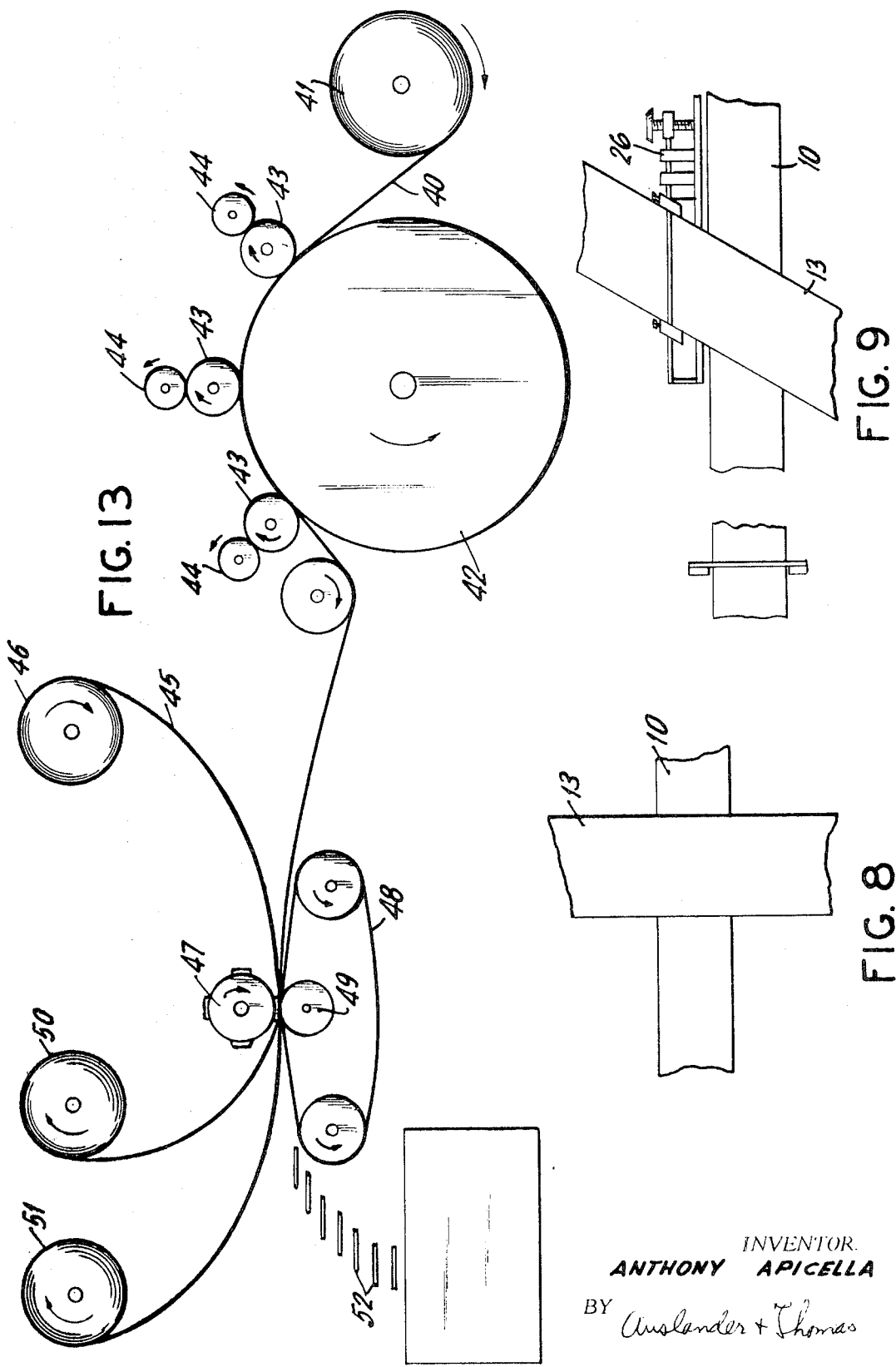

METHOD, APPARATUS AND DIE ADAPTED TO SIMULTANEOUSLY HEAT STAMP, EMBOSS AND CUT

The present invention relates to a method, apparatus and die adapted to simultaneously heat stamp, emboss and cut.

In certain of the printing arts, especially those dealing with the printing of labels or the like, it is often times desirable to produce a finished product which includes various ornamental features. Generally, the three most common of these features are printing, embossing and the heat stamping of a foil or plastic.

Especially in instances where the foil overlay or embossing was desired along the peripheral edge of the finished product, the cutting out of the finished product from the web became a critical problem and even minor errors in registration could result in substantial waste. A similar problem presents itself where there is embossing on any area of the label since special positioning on the label with respect to the cut edge of the label is likewise an important factor wherein even minor errors in registration could result in substantial waste.

Many devices have been known in the past whereby various embossing techniques, or foil or plastic overlay techniques were combined within the printing and cutting operations. In many of these devices the product, such as labels, were required to be subjected to repeat processing or progressive processing in order to obtain the required finished product. Each successive step represented a registrational problem, thus requiring greater time, effort and cost in production.

In my U.S. Pat. Ser. No. 3,289,573, there is described a reciprocating press adapted to produce finished cut labels having printing, embossing and foil or plastic heat stamped thereon, the labels produced on a single run through the press with the various of the ornamentation transferred to the labels at sequentially positioned stations. While the device therein described provides a substantial improvement over that which was used before, the progressive step operation with respect to the embossing, heat stamping and cutting still presents a problem with respect to the proper registration for the cutting of the label especially where the embossing and/or foil overlay is desired along the edges of the label or where such overlay is desired to be positioned on the label at particular selected areas with respect to the label's peripheral edge. Also, according to the present invention the required number of stations to complete a label is reduced.

According to the present invention there is provided a die which, in a single, simultaneous operation is adapted to emboss, heat stamp and cut a web through the web of foil or plastic to provide finished products, identical in nature. When the die of the present invention is combined with a printing press, preferably of the reciprocating type, as described in my U.S. Pat. Ser. No. 3,289,753, on a single run through, finished cut labels, having printing, embossing and heat stamped foil or plastic thereon can be produced with little or no loss in production due to improper registration.

The die of the present invention generally provides heating means, an intaglio portion, and a peripheral edge portion. Such peripheral edge is preferably steeply angulated and extends beyond the normal plane of the intaglio, to provide a ridge line. When the die of the present invention is impressed on an outer side portion of a transferor web of heat transferable material, such as a foil carrying web with a mylar substrate, the die will heat transfer the foil to the primary or transferee web without cutting through the transferor web, emboss the transferee web in relief of the intaglio and cut the transferee web in the shape predetermined by the die's ridge line. The web of waste carried on the substrate is carried away intact. If the web of waste of the transferee web is in roll form it may be carried away and the finished cut labels are removed from the flexible carrying surface over which rides the transferee web. If it is desired that the embossing be along the edge of the label, the ridge line may be integral to the intaglio along the peripheral edge of the intaglio.

The angulation and height of the ridge line of the die is predetermined with regard to the flexibility of the transferor web substrate, the tensile strength of the transferee web and the flexibility of the transferee web carrying surface.

It is to be appreciated that the transferor and transferee webs may be continuous webs continuously fed or may consist of single sheet lengths, the composition of the webs depending upon the nature and amount of the finished product desired, and/or the type of equipment employed.

Although such novel feature or features believed to be characteristic of the invention are pointed out in the claims, the invention and the manner in which it may be carried out may be further understood by reference to the description following and the accompanying drawings.

FIG. 1 is a side elevation, largely in diagrammatic form of a printing press adapted for use with a die of the present invention.

FIG. 8 is a sectional view showing the crossing of the webs.

FIG. 9 is a sectional view of an alternate web crossing.

FIG. 10 is a sectional view of another die of the present invention.

FIG. 11 is a sectional view of an alternate embodiment of the present invention.

FIG. 12 is a side elevation, partly in detail of an alternate transferee web of the present invention.

FIG. 13 is a schematic view of a rotational press adapted for use with the present invention.

Referring now to the figures in greater detail, where like reference numbers denote like parts in the various figures.

Figure 3A:
FIG. 3A is a sectional view of another die of the present invention.
Figure 2:
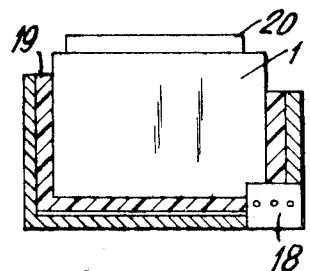
FIG. 2 is a front elevation of a die of the present invention.
Figure 3:
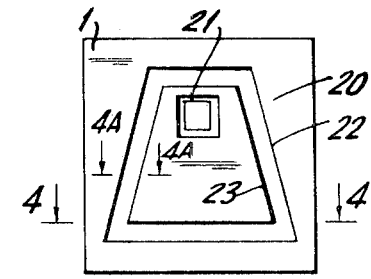
FIG. 3 is a top plan view of the die of FIG. 2.
Figure 5:
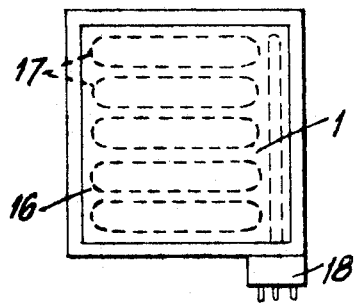
FIG. 5 is a bottom plan view of the die of FIG. 2.

As shown in FIG. 1, the die 1 of the present invention is readily adaptable for use with a reciprocating press 2 such as described in my U.S. Pat. Ser. No. 3,289,573, the press 2 generally comprising an upper frame 3 and lower frame 4, the lower frame 4 including a reciprocating piston 5 which is adapted to be operated up and down in a conventional manner such as by use of a motor, flywheel, gearing and crank shaft arrangement (not shown).

In view of the embossing accomplished by the die 1 or dies of the present invention, it is desirable that there be some flexibility of the transferee web. This may be an inherent characteristic of the web as hereinafter described, or, as shown in FIG. 1, a continuous web 6 of a firm yet yieldable substance such as rubber or other flexible or elastomeric substance is fed about a plurality of rollers 7 so as to override the lower frame 4, the web 6 feeding off the cut labels 8 to a receiving tray 9.

A transferee web 10 of paper foil or thin metal is preferably mounted on a spool 11 and fed on the carrier web 6, with the web of waste of the transferee web 10, after cutting, accumulated on spool 12.

The transferor web 13 which contains the foil or plastic to be heat transferred to the transferee web 10, is preferably fed from a spool 14 so as to cross the transferee web 10 at an angle, the webs 10, 13 crossing between the upper frame 3 and lower frame 4.

A takeup spool (not shown) for the waste material for the transferee web 13 is preferably provided. While the present invention is directed to the heat stamping, embossing and cutting operation, it is readily apparent that printing, by use of printing dies 15 may be readily employed on the press 2 so that the finished labels 8 are printed, heat stamped, embossed and cut.

The stamping, embossing and cutting die 1 such as shown in FIG. 2—5 includes heating means 16 such as a plurality of a calrod heating units 17 connected to an electric plug 18. The die 1 is preferably insulated such as by a layer of insulating material 19.

Figure 6:
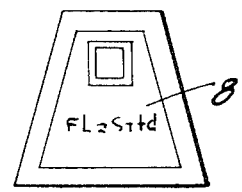
FIG. 6 is a plan view of a label made in accordance with the present invention.

A portion 20 of the die 1 includes at least one intaglio with an outer peripheral edge 22. The edge 22 is more steeply angulated than the inner peripheral edges 23 of the intaglio, the outer peripheral edge 22 providing a ridge line which extends beyond the normal upper plane of the intaglio. The ridge line or peripheral edge 22 defines the shape of the finished labels 8. Additional intaglios such as intaglio 21 may be provided on the die 1 so as to allow for the desired foil emplacement and embossing design on the finished label 8. Thus, where the die 1 has a portion 20 having an intaglio peripherally defining a truncated triangle and an inner intaglio 21 peripherally defining a square, the finished label will, as shown in FIG. 6, be of a truncated triangular shape with a square therein and may further include printing from the printing dies 15.

As shown in FIG. 3A, the intaglio 27 may be substantially recessed within the die 1 with the ridge line 28 extending beyond the normal plane of the intaglio 27.

Figure 7:
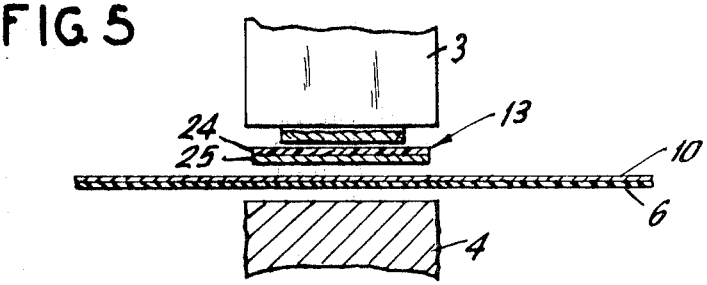
FIG. 7 is a detailed sectional view taken along lines 7-7 of FIG. 1.
Figure 7A:
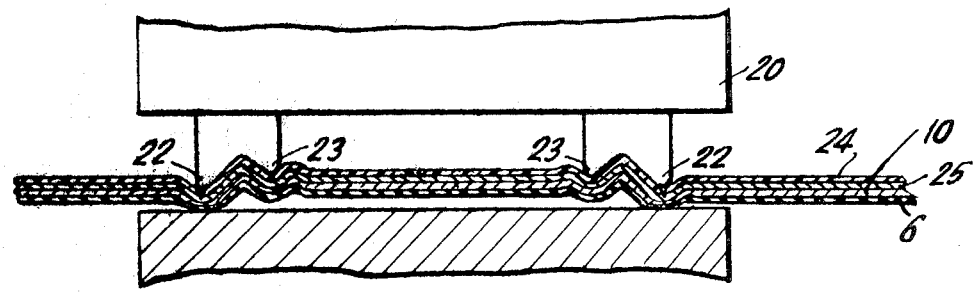
FIG. 7A is a detailed sectional view of the die of the present invention heat stamping, embossing and cutting.
Figure 4:
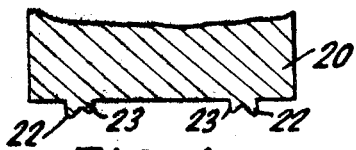
FIG. 4 is a sectional view taken along lines 4-4 of FIG. 3.
Figure 4A:
FIG. 4A is a cross-sectional detail taken along lines 4a-4a of FIG. 3.

As shown in FIGS. 7, 7A when the die 1 is brought to bear upon the underside of the transferor web 13, the flexible substrate 24 on the web 13 in contact with the ridge line distends, but does not break. The foil layer in contact with the die 1 within the intaglio is transferred to the transferee web 10. The carrying web 6 provides flexibility to the transferee web 10 sufficient so that the transferee web 10 is embossed in relief of the intaglios. The transferee web 10 is substantially taut and the ridge line with the transferor web 13 substrate thereabout cuts through the transferee web 10, cutting out a label 8 which is embossed, foil stamped through the embossing and cut.

As shown in FIGS. 8 and 9, where it is desirable to have the label 8 printed before the simultaneous stamping, embossing and cutting, the transferor web 10 may be positioned so as to cross the transferee web 13 for processing at an angle. In this manner, the transferor web 10 having the foil or heat transferable plastic thereon does not overlay the transferee web 13 along its entire length, but rather is positioned so as to cross the transferee web 13 at a point beneath the die 1. In this manner, printing, by printing die or dies 15 such as shown in FIG. 1 can be applied to the transferee web 13 during a single run before the embossing, heat stamping and cutting step, with the printing dies 15 positioned so as to apply by a "kiss" as distinguished from the greater pressure contact needed for the die 1 of the present invention.

While, as shown in FIG. 8, the crossing of the webs 10, 13 is preferable at substantially right angles, as shown in FIG. 9, where the desired shape of the finished label requires, or to suit existing machinery, the crossing may be at various angles. If desired, guides 26 may be provided for the webs 13, 10.

While it has been found that a transferor web of roll leaf having a substrate of ¾ millimeter of Mylar is readily suitable for use with the die of the present invention, various transferor webs, transferee webs and carrying webs are suitable.

As can be seen in FIG. 3A, the die 1 may also heat stamp a flat area and also emboss and heat stamp an intaglio 27 in a die 1.

While the die 1 hereinbefore described provided a ridge line integral to the intaglio, as shown in FIG. 10 a die 29 may be provided having a peripheral ridge line 30 spaced apart from the intaglio 31. In such manner the transferee web 10 is cut as defined by the ridge line 30. The embossing on a label so cut will be spaced apart from the edge of the label and properly positioned with respect to the edge of the label.

In FIG. 11, the flexible web 6 such as shown in FIG. 1 is dispensed with, and a mated die 32 provided for the cutting, embossing and stamping die 33. In such manner the flexibility requirements of the transferee web are imparted by such mated die 32 thereby allowing for embossing in relief of the intaglio on the die 33. Removal of the cut labels may be effected by means known in the art, or if desired, the dies 32, 33 may be positioned vertically with the webs 10, 13 substantially vertical as processed, with the finished cut labels gravity removed as cut.

As shown in FIG. 11, if desired, only selected areas of the label, such as the embossed area of the label need be foil stamped. The dies 32, 33 may include cutaway areas 34 so that the heated die 33 will only contact the transferor web 13 to bring the same in contact with the transferee web 10 at selected points.

Where, as shown in FIG. 12, the transferee web is a multilayered web 35, the construction of the web 35 imparts sufficient flexibility to the upper layer 36 of such web 35 as to allow for embossing by a single die, such as the die 1 of FIGS. 1—7, with the web 35 supported by a nonflexible bed 37. The transferee web 35 as shown in FIG. 12 is similar to those known in the art having an upper layer 36, a layer of adhesive 38, and a substrate 39 usually of paper.

Various other printing presses other than the reciprocating press shown in FIG. 1 may be adapted for use with the die of the present invention. As schematically shown in FIG. 13, a rotary press is employable. As shown, a transferee web 40 is fed, preferably from a spool 41 about a drum 42 where the transferee web 40 is printed by a plurality of rotation printing dies 43, inked if desired with different colors by separate ink supplies 44. The transferee web 40 is guided to its juxtaposition with the transferor web 45. The transferor web 45 is preferably fed from a spool 46 and guided about a rotary die 47 having thereon an intaglio and ridge line of the present invention.

The heat stamping, embossing and cutting is preferably effected on a flexible web 48 over a solid rotary bed 49 in a manner similar to that described with respect to FIG. 1, however, it is to be understood that the same may be effected in the manners described with respect to FIGS. 11 and 12 herein. The webs of waste from the transferor web 45 and transferee web 40 are preferably collected on takeup spools 50 and 51 respectively, with the finished labels 52 removed and collected in the manner heretofore described.

The terms and expressions which are employed are used as terms of description; it is recognized, though, that various modifications are possible within the scope of the invention claimed.

Having thus described certain forms of the invention in some detail, what I claim is:

1. Means to simultaneously heat transfer material and emboss and cut a workpiece comprising, a die, means to transmit heat to said die, an intaglio design on said die, a peripheral ridge line on said die, said ridge line projecting from the surface of said die and forming a means for cutting said workpiece, a flexible substrate having heat transferable material thereon, means to support said workpiece, means to pass said flexible substrate with said heat transferable material between said die and said workpiece, and compression means to impress said intaglio design on said substrate to transfer said heat transferable material to said workpiece and emboss said workpiece in relief of said intaglio design, said ridge line flexing said flexible substrate without penetrating it while penetrating said workpiece to cut said workpiece along said ridge line.

2. The invention of claim 1 wherein said ridge line is integral to the peripheral edge of said intaglio design.

3. The invention of claim 1 wherein said peripheral ridge line is steeply angulated.

4. The invention of claim 1 wherein said intaglio design is on a lane extending from a cutaway base portion of said die.

5. The invention of claim 1 wherein said ridge line defines the periphery of the cut workpiece.

6. The invention of claim 1 wherein said die includes a plurality of intaglio design portions within the periphery of said ridge line.

7. The invention of claim 1 wherein said means to support is flexible.

8. The invention of claim 7 wherein said flexible support includes a belt of elastomeric material.

9. The invention of claim 1 wherein said means to support said workpiece includes a second die disposed beneath said workpiece, said second die substantially mated to said first referred to die.

10. The invention of claim 1 wherein said workpiece includes at least one additional layer between said workpiece and said support.

11. The invention of claim 1 wherein said substrate is a web and said workpiece is a web, and means to juxtapose said substrate web and said workpiece web.

12. The invention of claim 11 including means to continually feed said substrate web and means to continually feed said workpiece web.

13. The invention of claim 11 wherein said substrate passes between said die and said workpiece angularly disposed with respect to the longitudinal plane of said workpiece.

14. The invention of claim 13 wherein said angular disposition is at a substantially 90 degree angle.

15. The invention of claim 11 including means to remove said cut workpiece.

16. The invention of claim 1 wherein said substrate is of a flexible plastic.

17. The invention of claim 1 including printing means and means to transfer said workpiece in juxtaposition with said die and said substrate.

18. The invention of claim 1 in combination with a reciprocating press.

19. The invention of claim 1 in combination with a rotary press.